US008612472B2

(12) United States Patent
Kenthapadi et al.

(10) Patent No.: US 8,612,472 B2
(45) Date of Patent: Dec. 17, 2013

(54) DETERMINING PREFERENCES FROM USER QUERIES

(75) Inventors: Krishnaram N. G. Kenthapadi, Mountain View, CA (US); Indraneel Mukherjee, Princeton, NJ (US); Stelios Paparizos, Mountain View, CA (US); Panayiotis Tsaparas, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 12/639,021

(22) Filed: Dec. 16, 2009

(65) Prior Publication Data

US 2011/0145227 A1    Jun. 16, 2011

(51) Int. Cl.
*G06F 17/30* (2006.01)
(52) U.S. Cl.
USPC .......................................................... 707/769
(58) Field of Classification Search
None
See application file for complete search history.

(56) References Cited

U.S. PATENT DOCUMENTS

| | | | |
|---|---|---|---|
| 5,754,939 A * | 5/1998 | Herz et al. ............ | 707/E17.109 |
| 6,029,195 A * | 2/2000 | Herz .......................... | 707/999.01 |
| 6,298,348 B1 * | 10/2001 | Eldering ................ | 707/999.004 |
| 6,574,616 B1 | 6/2003 | Saghir | |
| 6,801,909 B2 | 10/2004 | Delgado et al. | |
| 6,850,934 B2 | 2/2005 | Bates et al. | |
| 6,922,700 B1 * | 7/2005 | Aggarwal et al. ...... | 707/999.002 |
| 6,980,984 B1 | 12/2005 | Huffman et al. | |
| 7,089,237 B2 * | 8/2006 | Turnbull et al. ........ | 707/999.005 |
| 7,257,570 B2 | 8/2007 | Riise et al. | |
| 7,302,406 B2 * | 11/2007 | Mallo et al. ............ | 707/999.005 |
| 7,574,426 B1 * | 8/2009 | Ortega ................... | 1/1 |
| 7,716,207 B2 * | 5/2010 | Odom et al. ................... | 707/708 |
| 7,953,720 B1 * | 5/2011 | Rohde et al. ................... | 707/706 |
| 8,065,290 B2 * | 11/2011 | Hogue ......................... | 707/706 |
| 2003/0195834 A1 | 10/2003 | Hillis et al. | |
| 2005/0192981 A1 * | 9/2005 | Nelson ......................... | 707/100 |
| 2009/0228353 A1 | 9/2009 | Achan et al. | |
| 2010/0262603 A1 * | 10/2010 | Odom et al. ................... | 707/728 |

OTHER PUBLICATIONS

Jaynes, Edward T., "Prior Probabilities", IEEE Transactions on Systems Science and Cybernetics, vol. Sec-4, No. 3, 1968, pp. 227-241.*
Agichtein, et al., "Improving Web Search Ranking by Incorporating User Behavior Information", Retrieved at <<http://www.mathcs.emory.edu/~eugene/papers/sigir2006ranking.pdf>> In the proceedings of the 29th annual international ACM SIGIR conference on research and development in information, Aug. 6-11, 2006, pp. 8.

(Continued)

*Primary Examiner* — Debbie Le
(74) *Attorney, Agent, or Firm* — Microsoft Corporation (57) ABSTRACT

A query may be received at a computing device through a network. One or more attribute values that are preferences for a subset of the one or more terms of the query may be identified by the computing device. One or more products or services having associated attributes that have values that match a subset of the identified attribute values may be identified by the computing device, and a subset of the identified products or services may be presented by the computing device through the network. Implementations may also identify latent preferences, that is, preferences that are found for a query even where such a preference is not explicitly part of a term or token of the query.

17 Claims, 5 Drawing Sheets

(56) References Cited

OTHER PUBLICATIONS

Li, et al., "Extracting Structured Information from User Queries with Semi-Supervised Conditional Random Fields", Retrieved at <<http://www.cc.gatech.edu/~zha/CSE8801/query-annotation/p572-li.pdf>> In the proceedings of the 32nd international ACM SIGIR conference on research and development in information retrieval, Jul. 19-23, 2009, pp. 572-579.

* cited by examiner

DETERMINING PREFERENCES FROM USER QUERIES

BACKGROUND

Millions of users submit queries to search engines, provider websites, or merchant websites every day. Often the users are looking for information that is stored as structured data. Many merchants and providers store information about their products and services as structured data such as tables of attributes having various values associated with the products and services. Examples of structured data include product catalogs, travel databases about hotels, airlines or rental cars databases, and image databases.

While storing information as structured data may make it easier to use the data to populate webpages or catalogs or to generate reports, for example, the use of structured data may cause problems with respect to traditional keyword based methods for fulfilling queries. Typically, the language used by users posing queries is different from the representation used in the underlying structured data. For example, the query "brown sweater" may fail to match a product having structured data that includes the color "chestnut" using traditional text based or keyword based searching methods even though the product may in fact be relevant to the query.

SUMMARY

Queries received over time from users searching over structured data, along with data tuples relevant to the queries, and the attributes and values for structured data tuples are collected. The terms of the queries are correlated with attribute values from the structured data to identify attribute values that are preferences for query terms. When a later query is received, the preferences can be used to identify products that are relevant to the query based on structured data associated with the products.

A query may be received at a computing device through a network. One or more attribute values that are preferences for a subset of one or more terms of the query may be identified by the computing device. One or more products having associated attributes values that match a subset of the identified attribute values may be identified by the computing device, and a subset of the identified products may be presented by the computing device through the network.

Implementations may include some of the following features. The subset of the identified products may be presented in a webpage. The identified products may be ranked, and the subset of the identified products may be presented in ranked order. The identified products may be ranked based on the number of attribute values that match the identified one or more attribute values. Identifying one or more attribute values that are preferences for a subset of the one or more terms may include determining terms from the subset of terms that match terms of structured data, and for the terms from the subset of terms that do not match terms of the structured data, identifying one or more attribute values that are preferences for the terms that do not match terms of the structured data.

A mapping of attributes values to data tuples (e.g., attribute values) may be received at a computing device through a network. A table of attribute values corresponding to the data tuples may be received at the computing device through the network. For a subset of the attributes values in the table, a prior probability of each attribute value in the subset may be determined by the computing device. For each query in a subset of queries of the mapping, a posterior probability of each attribute value mapped to the query may be determined by the computing device. For each attribute value mapped to a query, it may be determined whether the determined posterior probability of the attribute value is greater than the determined prior probability for the attribute value, with sufficient confidence, and if so, the attribute value is determined to be a preference for the query.

Implementations may include some of the following features. The determined attribute value may comprise a range of attribute values. The table of attribute values may be structured data. A query may be received, and one or more attribute values that are a preference for the query may be identified. A plurality of products (and/or services, for example) having at least one attribute value that matches an identified attribute value may be presented. The products may be ranked using the identified attribute values and presented in ranked order. A confidence value associated with the posterior probability distribution and the prior probability distribution may be determined, and it may be determined that the attribute value is a preference for the query only if the confidence value is greater than a threshold.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
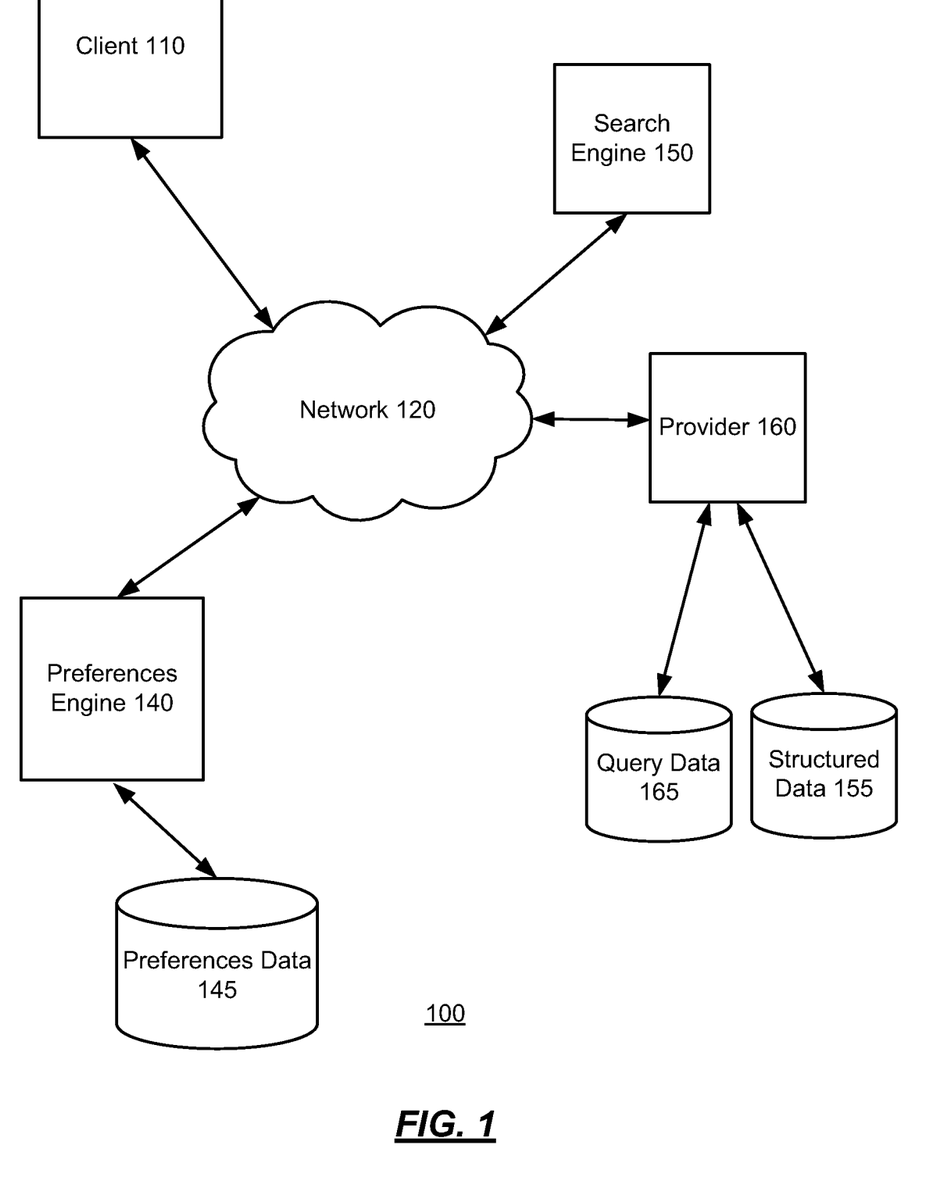
FIG. 1 is an illustration of an exemplary environment for providing and determining preferences from user queries.

FIG. 1 is an illustration of an exemplary environment 100 for providing and determining preferences from user queries. A client 110 may communicate with a search engine 150 or a provider 160 through a network 120. The client 110 may be configured to communicate with the search engine 150 and/or provider 160 to access, receive, retrieve, and display media content and other information such as webpages and websites. The network 120 may be a variety of network types including the public switched telephone network (PSTN), a cellular telephone network, and a packet switched network (e.g., the Internet). Although one search engine 150 and one provider 160 is shown in FIG. 1, it is contemplated that the client 110 may be configured to communicate with one or more search engines or one or more providers through the network 120.

In some implementations, the client 110 may include a desktop personal computer, workstation, laptop, personal digital assistant (PDA), cell phone, or any WAP-enabled device or any other computing device capable of interfacing directly or indirectly with the network 120. The client 110 may be implemented using one or more computing devices such as the computing system 500 illustrated in FIG. 5. The client 110 may run an HTTP client, e.g., a browsing program, such as MICROSOFT INTERNET EXPLORER or other browser, or a WAP-enabled browser in the case of a cell phone, PDA, or other wireless device, or the like, allowing a user of the client 110 to access, process, and view information and pages available to it from the search engine 150 or the provider 160.

The search engine 150 may be configured to provide data relevant to queries received from users using devices such as the client 110. The provider 160 may be a server hosting a website that allows users to search for and view products and services. For example, the provider 160 may host a website of a camera retailer and users may browse and search for cameras available for sale by providing queries to the provider 160 and receiving listings of matching products from the provider 160 in response to the query. Other types of retailers, for example, may also be associated with the provider 160.

In some implementations, the provider 160 may access and store structured data 155. The structured data 155 may include various attributes associated with each product or service offered by the provider 160. Each attribute may have one or more associated values. In addition, while not shown, the search engine 150 may access structured data 155 for one or more providers 160. In some implementations, the search engine 150 may access the structured data 155 stored at the provider 160, or may alternatively be provided a copy of the structured data 155 that may then be stored locally at the search engine 150.

For example, a provider 160 may be a shoe retailer and each shoe may have one or more attributes that describe the qualities and characteristics of the shoe. Typical attributes associated with the shoe may include "color", "size", "width", "style", "price", etc.

Further, each shoe may have one or values associated with one or more of the attributes. Because every attribute may not be applicable to each shoe, each attribute may not have a corresponding value for each product. In some implementations, each product and its associated attributes may be implemented as a table. However, other data structures may be used. An example product attribute table for four shoes is shown as Table 1:

TABLE 1

| SHOE ID | TYPE | COLOR | SIZES | PRICE |
|---|---|---|---|---|
| 1 | SHOE | RED | W7-12 | $100 |
| 2 | BOOT | BLACK | M8-15 | $ 50 |
| 3 | SHOE | BLUE | M8-12 | $ 60 |
| 4 | SHOE | GREEN | W6-9 | $ 99 |

Typically, when a user at a client 110 wants to purchase or locate a product or service, the user may generate a query that corresponds to the product and may provide the query to the search engine 150 or directly to the provider 160. For example, a user may want to find boots matching the query "motorcycle boots". The user may provide the query "motorcycle boots" to the search engine 150. The search engine 150 may then return a set of webpage identifiers (e.g., URLs) to the user of the client 110 that may identify websites at providers such as the provider 160. Alternatively or additionally, the user may provide the query directly to the provider 160.

The search engine 150 and/or the provider 160 may process the query by matching the query against an index of stored keywords. For example, the search engine 150 may compare the query "motorcycle boots" against keywords stored for indexed webpages. Webpages having keywords that match "motorcycle boots" may then be identified for the user at the client device 110.

A shortcoming of the above discussed technique is that when providers store their products and services as structured data, the queries entered by users may fail to match against the values stored for the attributes of the products and services identified in the structured data 155. For example, referring to the table above, using a keyword search, the query "motorcycle boots" will not match any of the attribute values stored in the table, even through the product of type "boot" and color "black" may in fact be what the user who submitted the query is looking for.

To overcome this, preferences corresponding to particular attribute values in the structured data for user queries may be determined. The preferences may be attribute values that may be substituted for one or more terms of a query and may be used to identify products or services that are relevant to the query in the structured data based on the attribute values stored in the structured data.

Continuing the example above, the user may submit the query "motorcycle boots". However, rather than identifying webpages that include the words "motorcycle" and "boots", the provider 160 (or the search engine 150) may have previously determined that the attribute values "boot" and "black" are preferences for the query "motorcycle boots". Accordingly, the user may be provided with products that have attributes with values that match "boot" and "black". Example methods and techniques for determining the preferences are discussed further herein.

In some implementations, the preferences may be determined by a preferences engine 140. The preferences engine 140 may be implemented by one or more computing devices such as the computing system 500 illustrated in FIG. 5, for example.

In some implementations, the preferences engine 140 may receive query data 165. The query data 165 may be a mapping or association of queries to attribute values. In some implementations, the query data 165 may represent all, or a subset of, queries submitted by users mapped to the attribute values of products or services that the users ultimately selected or purchased. The query data 165 may have been generated by the provider 160 or the search engine 150, for example.

Continuing the example described above, a user may have submitted the query "motorcycle boots" to the search engine 150. After some period of time, the user may have purchased the shoe having the shoe ID equal to 2. The query "motorcycle boot" in the query data 165 may then be mapped to the attribute values associated with the shoe having the shoe ID equal to 2 shown in Table 1.

In some implementations, the query data 165 is received by the preferences engine 140 from a search engine 150 and/or directly from a provider 160. The query data 165 may be based on the queries received and the products and/or services purchased or selected by users. In some implementations, the query data 165 may be determined by mining query logs, browse trails, or search sessions, for example. In other implementations, the query data 165 may be manually generated by users or may be generated by data collected from toolbars or other software applications installed at one or more client devices. While the query data 165 is illustrated as being stored and generated by the provider 160, it is for illustrative purposes only. The query data 165 may also be stored and generated by the search engine 150 or the client 110. The query data 165 may further be a combination of query data 165 received from multiple sources, including the client 110, the search engine 150, and the provider 160, for example.

In some implementations, the query data 165 may be limited to a particular genre or category of queries. For example, the queries in the query data 165 may be limited to queries for food or restaurants. In addition, the queries may be limited to queries received in certain time periods, such as during a weekend or around certain holidays. For example, during the Christmas season, user queries may exhibit different preferences than during other times of the year. Query data 165 associated with specific time periods or genres may be used to identify preferences that may be more accurate when applied to queries in the same time period or genre than preferences based on more general data.

In some implementations, the preferences engine 140 may receive structured data 155. The structured data 155 may be received from one or more providers or search engines and may comprise a data structure containing the attributes and associated values for a subset or all of the products or services offered by one or more providers 160. The above Table 1 is an example of such a data structure. In an implementation, the table has a row corresponding to each product offered and a column entry for each attribute. While the table illustrated in Table 1 only has five attributes, it is contemplated that there may be hundreds or even thousands of attributes associated with each entry. There is no minimum or maximum number of attributes that may be supported.

In some implementations, the structured data 155 represents the products and/or services offered by one or more providers in a particular category or genre. For example, the products in the structured data 155 may be limited to electronic products or televisions, for example. Other categories or genres may also be used.

Figure 2:
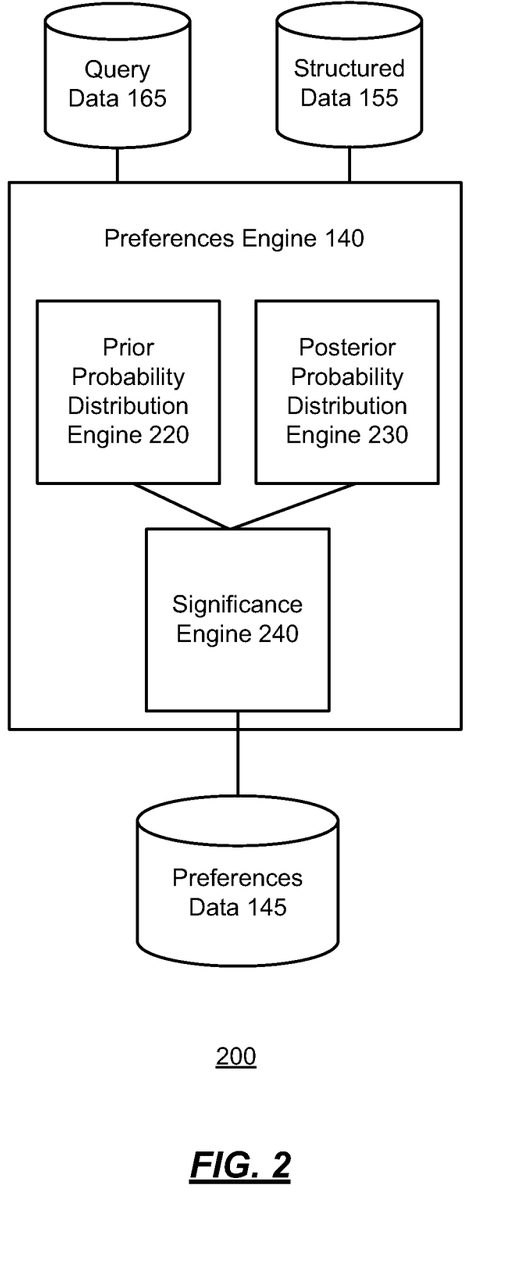
FIG. 2 is an illustration of an implementation of a system comprising an exemplary preferences engine.

As described further with respect to FIG. 2, the preferences engine 140 may determine the preferences for user submitted queries using both the query data 165 and the structured data 155. One type of preference that may be determined is referred to herein as a latent preference. A latent preference may be preference that is found for a query even where such a preference is not explicitly part of a term or token of the query. For example, a user may submit the query "jeans". The preferences engine 140 may determine that the value "denim" for an attribute "material" is a preference for the query "jeans". This type of preference is direct in the sense that the value "denim" is substituted for the term "jeans". In contrast, consider the query "washing machine". The preferences engine 140 may determine that the value "white" for an attribute "color" may be a preference for the query "washing machine". While no color was provided in the search query, many users who query for washing machines may have ultimately purchased white washing machines which may indicate a latent preference for white washing machines.

In some implementations, the preferences may further include numerical ranges or maximum and minimum values. For example, certain products or services may have attributes with numerical values. Laptop products may have an attribute "screen size" that may have a value that is equal to the diagonal screen size, digital cameras may have an attribute "megapixels" which may have a value that is equal to the size of the camera sensor in megapixels, etc. For numerical values like these and others, the preferences engine 140 may determine a numerical range or minimum or maximum value preference for a query.

For example, one or more users looking for a laptop may have submitted the query "small laptop". Those users who submit the query may have then gone on to purchase laptops that have an attribute "weight" that is between the values of 2 and 6 pounds, for example. Accordingly, the preferences engine 140 may determine that values of the attribute weight between 2 and 6 pounds are preferences for the query "small laptop".

In some implementations, the preferences engine 140 may store the generated preferences as the preferences data 145. The preferences data 145 may be an association or mapping of queries to attribute values that have been determined to be preferences for the queries. The preferences data 145 may be used by the provider 160 or the search engine 150 to recommend products or services represented by the structured data 155 based on a received query.

FIG. 2 is an illustration of an implementation of a system 200 comprising an exemplary preferences engine 140. The preferences engine 140 may generate preferences data 145 using query data 165 and structured data 155.

In an implementation, detecting user preferences over structured data may comprise determining a prior probability distribution, determining a posterior probability distribution, and performing a significance test for preferences. In an implementation, the input may comprise a set S of $(q, p_i)$ pairs where $p_i$ is a relevant data tuple for query q; a table T whose rows represent tuples, $p_i$ and whose columns represent values of different attributes, $a_1, a_2, \ldots, a_k$; a threshold parameter $\tau$; a confidence parameter conf; and a predicate P( ) over queries.

In an implementation, the prior probability distribution may be determined of <attribute, value> pairs over data tuples in table T and over all queries in set S or, possibly over queries satisfying a predicate (e.g., queries over the same category as the candidate query, for product data). For posterior probability distribution, as described further herein, for each query q, the empirical probability distribution may be determined of <attribute, value> pairs over data tuples relevant for the query q. For a significance test for preferences, as described further herein, for each query q, <attribute, value> pairs may be determined whose empirical probability increases significantly and with high confidence due to the presence of query q.

In some implementations, the preferences engine 140 may include a prior probability distribution engine 220. The prior probability distribution engine 220 may generate what is referred to herein as the prior probability distribution that includes the prior probability for each attribute value in the structured data 155. The prior probability distribution of an attribute value is the prior probability for the attribute value among the attribute values in the structured data 155. In some implementations, the prior probability distribution may be determined only for attribute values associated with products and services in a subset of the products and services included in the structured data 155. For example, the prior probabilities may only be determined for values associated with products that are shoes, or some other subset of products.

In some implementations, the prior probabilities may be calculated according to equation (1). Given a query q, for each attribute a, and for each possible value $v_i$ of the attribute a, and for all predicates P, the prior probability Pr is given by:

$$Pr[a = v_i \mid P( )] = \frac{|(q', p) \in S: p \cdot a = v_i \text{ and } P(q')|}{|(q', p) \in S: P(q')|}. \quad (1)$$

In some implementations, the preferences engine 140 may include a posterior probability distribution engine 230. The posterior probability distribution engine 230 may generate what is referred to herein as the posterior probability distribution that includes the posterior probability of each attribute value associated with each query in the query data 165. The posterior probability distribution of an attribute value is the probability for the attribute value among the attribute values mapped to a particular query in the query data 165. Similarly as described above for the prior probability distribution, in some implementations, the posterior probability distribution may be determined only for a subset of attribute values or a subset of the queries. For example, the posterior probabilities may only be determined for queries related to shoes.

In some implementations, the posterior probability distribution may be calculated according to equation (2). For each query q, for each attribute a, for each value $v_i$ that the attribute a can take, and for all predicates P, the posterior probability Pr is given by:

$$Pr[a = v_i \mid q, P(\,)] = \frac{|(q', p) \in S: \ q' = q \ \text{and} \ p \cdot a = v_i \ \text{and} \ P(q)|}{|(q', p) \in S: \ q' = q \ \text{and} \ P(q)|}. \quad (2)$$

In some implementations, the preferences engine 140 may further include a significance engine 240. The significance engine 240 may use the generated prior and posterior probability distributions to determine if the posterior probability of a value with an attribute that is mapped to a particular query (i.e., through the query data 165) is greater than the determined prior probability of the value in the table. If the posterior probability is greater, then the value may be used as a preference for the particular query.

In some implementations, the posterior probability must be greater than the prior probability by a factor of a threshold amount in order for the attribute value to be used as a preference for the particular query. Thus, for example, if the threshold is set to 2, and the posterior probability is greater than the prior probability by less than a factor of 2 (i.e., the ratio does not meet a minimum threshold amount), then the value of the attribute is disregarded and not used as a preference for the particular query. The threshold may be determined by a user or administrator, for example. A lower threshold value may result in a greater number of preferences, but at the expense of accuracy. Similarly, a higher threshold will result in fewer, but more accurate preferences.

In some implementations, the significance engine 240 may further determine if the difference between the prior and posterior probability of an attribute value has a confidence value that is greater than a threshold. For example, some queries and/or values may not have enough entries in the query data 165 to be statistically significant and may have a low confidence value. The confidence value may be calculated using any of a variety of well known techniques for generating confidence values.

In some implementations, the significance engine 240 may determine that an attribute is a preference for a query using equation (3). For each query q, it may be determined the <attribute, value> pairs <a, $v_i$> whose probability increases significantly and with high confidence due to the presence of query q, that is determine <a, $v_i$> such that $$\frac{Pr[a = v_i \mid q, P(\,)]}{Pr[a = v_i \mid P(\,)]} > \tau \ \text{with confidence} > \text{threshold confidence.} \quad (3)$$

In some implementations, the preferences engine 140 may store the generated preferences as preferences data 145. The preferences data 145 may be a mapping of queries or query terms to generated preferences. In some implementations, there may be multiple preferences associated with a query or query terms. In addition, the preferences data 145 may separated into genre or time period specific sets. The preferences engine 140 may then select the appropriate set to use to determine preferences based on the genre or time period associated with the query.

Figure 3:
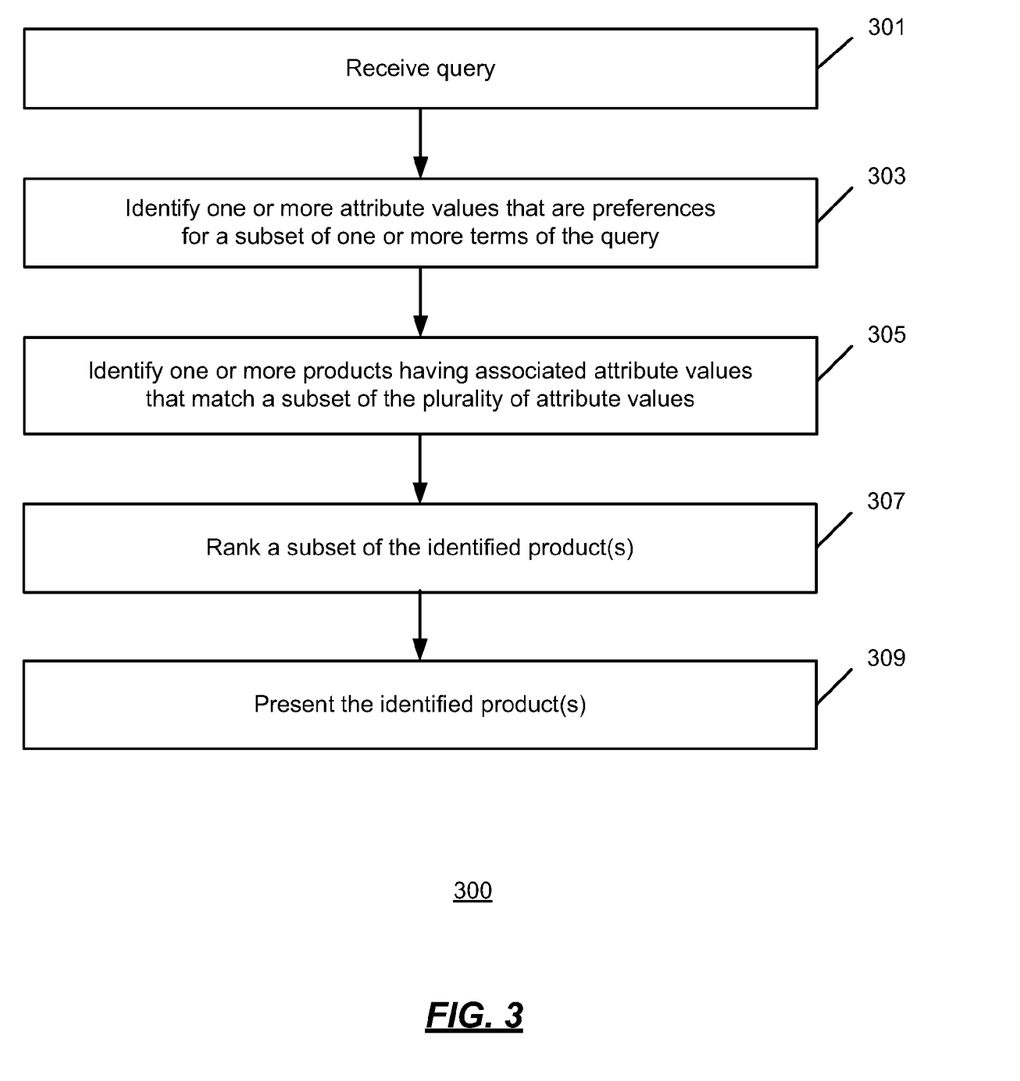
FIG. 3 is an operational flow of an implementation of a method for providing recommendations in response to user queries using preferences.

FIG. 3 is an operational flow of an implementation of a method 300 for providing recommendations in response to user queries using preferences. The method 300 may be implemented by one or more of the search engine 150, the preferences engine 140, and the provider 160, for example.

A query is received (301). In some implementations, the query may be received by a provider 160 or a search engine 150 from a user at a client 110. The query may comprise one or more terms. For example, a user may want to purchase a new laptop to watch movies and may enter the query "large laptop" into a text box or other user interface component of a webpage hosted by a provider 160 that sells electronic products. In the example described, the terms of the query may be "laptop" and "large".

One or more attribute values that are preferences for a subset of the one or more terms are identified (303). The attribute value(s) may be identified by a provider 160 or search engine 150 using the preferences data 145. The preferences data 145 may be table or other data structure that maps or associates queries and/or query terms with attribute values associated with one or more products and services identified by the structured data 155. In some implementations, the preferences data 145 may have been generated from query data 165 and structured data 155 by the preferences engine 140. For example, the provider 160 may use the preferences data 145 to determine that with respect to laptops, an attribute "screen size" having a value of "15 inches" or greater is a preference for the query "large laptop". In addition, latent preferences may also be identified.

In some implementations, identifying one or more attribute values that are preferences for a subset of the one or more terms may include identifying the terms of the query that do not match with attributes of structured data. Because some of the terms of the query already match terms associated with the structured data, it may not be necessary to replace all of the terms of the query with preferences. Thus, in some implementations, only one or more attribute values that are preferences for the terms that do not match terms of the structured data are identified. For example, the term "boot" from the query "Harley-Davidson boot" may match the term "boot" in structured data. However, the term "Harley-Davidson" may not match the structured data, and a preference for the term "Harley-Davidson" may then be identified.

One or more products having associated attribute values that match a subset of the identified attribute value(s) are identified (305). The product(s) may be identified from the structured data 155 by identifying products that have attribute values that match the identified attribute value(s). Continuing the example described above, the structured data 155 may be searched for one or more laptops that have an attribute "screen size" that is greater than 15 inches. In implementations where some of the terms of the queries matched terms of the structured data, the matching terms may also be matched against the product attribute values.

The identified one or more of products may be ranked (307). The one or more products may be ranked by the search engine 150 or the provider 160, for example. The one or more identified products may be ranked using a variety of factors, including based on the number of matching attribute values that each product matches or based on a numerical value of one or more of the matching attribute vales. For example, the matching laptops described above may be ranked according to the attribute "screen size."

A subset of the one or more identified products is presented (309). The subset of the identified products may be presented to a user at the client 110 by the provider 160 or the search engine 150, for example. In some implementations, the products may be presented in a webpage with images or descriptions corresponding to each of the identified products in the subset. In implementations where the products are ranked, the products may be presented in a ranked order.

Figure 4:
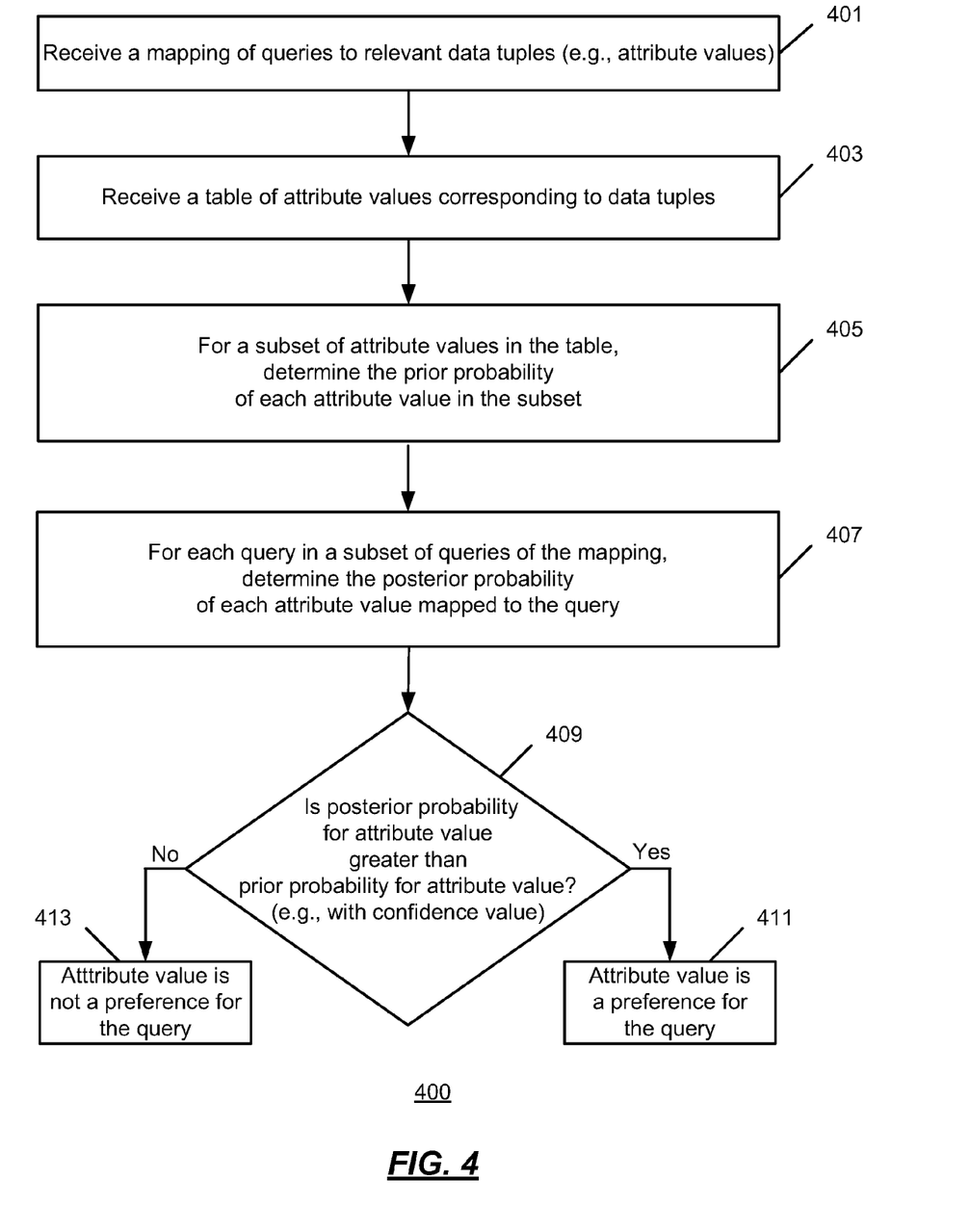
FIG. 4 is an operational flow of an implementation of a method for determining preferences from user queries.

FIG. 4 is an operational flow of an implementation of a method 400 for determining preferences from user queries. The method 400 may be implemented using the preferences engine 140, for example.

A mapping of queries to relevant tuples is received (401). The mapping may comprise the query data 165 and may be received by the preferences engine 140 from the search engine 150 or the provider 160. The relevant tuples may include attributes and each attribute in the mapping may have one or more associated values. The query data 165 may map or associate the queries that were submitted by one or more users over time with the attribute values associated with the products and/or services that the users ultimately purchased.

A table of attribute values is received (403). The table of attribute values may comprise the structured data 155 and may be received by the preferences engine 140 from the search engine 150 or the provider 160. The structured data 155 may be a table comprising a row entry for each service or product, or a subset of the services or products, offered by the provider 160, for example. Other data structures may also be used.

For a subset of attribute values in the table, the prior probability distribution of each attribute value in the subset is determined (405). The probability may be determined by the prior probability generator 220 of the preferences engine 140, for example. A prior probability describes the frequency with which a particular attribute value appears in the structured data 155. Any system, method, or technique for generating a probability distribution may be used.

For each query in a subset of queries of the mapping, the posterior probability of each attribute value mapped to the query is determined (407). The probability may be determined by the posterior probability distribution engine 230, for example. The posterior probability of an attribute value for a query describes the frequency with which the particular attribute value appears in the query data 165 associated with the query. Any system, method, or technique for generating a probability distribution may be used.

For each query from the subset of queries, it is determined if the posterior probability for a value is greater than the prior probability for that value (409). The determination may be made by the significance engine 240, for example. If it is determined that the posterior probability for an attribute value is greater than the prior probability for that value, then the value is determined to be a preference for the query (411). Otherwise, the attribute value is not a preference for the query (413).

In some implementations, the significance engine 240 may further determine a confidence value associated with the determination at 409. For example, if the determination that the posterior probability is greater than the prior probability has a confidence value below a threshold, then the determination may be considered unreliable by the significance engine 240 and disregarded. If the determination meets or exceeds a threshold, for example, then the determination may be considered reliable and the determination may be retained with processing continuing at 411.

Figure 5:
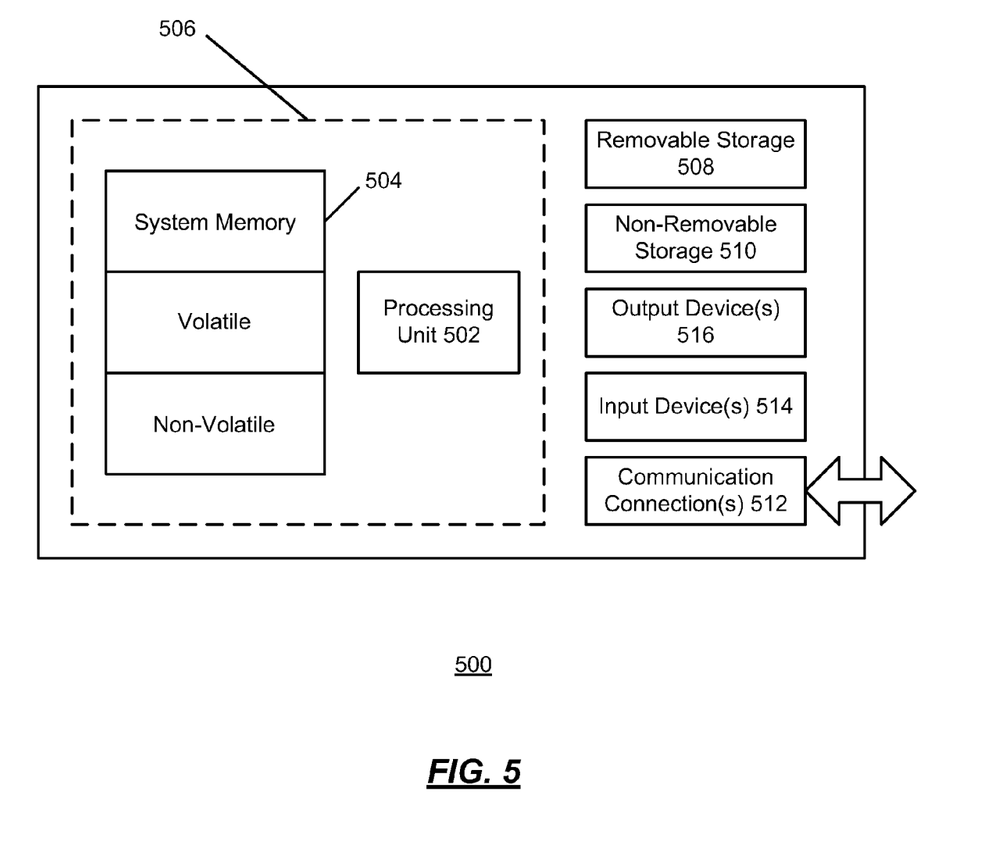
FIG. 5 is a block diagram of a computing system environment according to an implementation of the present system.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communications connection(s) 512 that allow the device to communicate with other devices. Computing system 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a query at a computing device through a network, wherein the query comprises a plurality of query terms;
   determining a first subset of query terms of the plurality of query terms that match attribute values of structured data by the computing device;
   determining a second subset of query terms of the plurality of query terms that do not match attribute values of the structured data by the computing device;
   for the query terms of the second subset of query terms, identifying one or more attribute values that are preferences for the query terms of the second subset of query terms by the computing device, wherein identifying one or more attribute values that are preferences for the query terms of the second subset of query terms uses a prior probability distribution of the attribute values and uses a posterior probability distribution for attribute values mapped to the query terms by, for each attribute value mapped to a query term, determining if a posterior probability of the attribute value is greater than a prior probability for the attribute value, and if so, identifying the attribute value as a preference for the query term;
   identifying one or more products having associated attribute values that match a subset of the identified one or more attribute values by the computing device; and
   presenting a subset of the one or more identified products by the computing device through the network.

2. The method of claim 1, further comprising:
   identifying one or more attribute values that are latent preferences for the query, wherein the preferences are not explicitly part of a query term or token of the query; and
   identifying one or more products having associated attribute values that match the first subset of query terms and the identified one or more attribute values that are latent preferences.

3. The method of claim 1, wherein the subset of the one or more identified products is presented in a webpage.

4. The method of claim 1, further comprising ranking the identified one or more products, and presenting the subset of the one or more identified products in a ranked order.

5. The method of claim 4, wherein the identified one or more products are ranked based on a number of attribute values that match the identified one or more attribute values.

6. The method of claim 1, wherein the preferences comprise a plurality of value ranges.

7. A method comprising:
   receiving a mapping of attribute values to query terms at a computing device through a network;
   receiving a table of attribute values at the computing device through the network;
   for a subset of the attribute values in the table, determining a prior probability of each attribute value in the subset by the computing device;
   for each query term in a subset of the query terms of the mapping, determining a posterior probability of each attribute value mapped to the query term by the computing device;
   for each attribute value mapped to a query term, determining if the determined posterior probability of the attribute value is greater than the determined prior probability for the attribute value, and if so, determining that the attribute value is a preference for the query term;
   receiving a query by the computing device, wherein the received query comprises a plurality of query terms;
   determining a first subset of query terms of the plurality of query terms of the received query that match attribute values of the table of attribute values by the computing device;
   determining a second subset of query terms of the plurality of query terms of the received query that do not match attribute values of the table of attribute values by the computing device;
   for the query terms of the second subset of query terms, identifying one or more attribute values that are preferences for the query terms of the second subset of query terms by the computing device; and
   presenting a plurality of products or services having at least one attribute value that matches an identified attribute value by the computing device.

8. The method of claim 7, wherein the preference comprises a latent preference.

9. The method of claim 7, wherein the determined attribute value comprises a range of attribute values.

10. The method of claim 7, wherein the table of attribute values comprises structured data.

11. The method of claim 7, further comprising ranking the plurality of products using the identified attribute values and presenting the plurality of products in a ranked order.

12. The method of claim 7, further comprising determining a confidence value associated with the posterior probability and the prior probability, and only determining that the attribute value is a preference for the query term if the confidence value is greater than a threshold.

13. The method of claim 7, further comprising determining if a ratio of the posterior probability to the prior probability is above a threshold and if so, determining that the attribute value is a preference for the query term.

14. A system comprising:
at least one computing device that:
receives a mapping of attribute values to query terms; and
receives a table of attribute values;
a prior probability distribution determiner that, for a subset of the attribute values in the table, determines a prior probability distribution of the attribute values;
a posterior probability distribution determiner that, for each query term in a subset of the query terms of the mapping, determines a posterior probability distribution for attribute values mapped to the query term; and
a significance determiner that determines, for an attribute value mapped to a query term, if a posterior probability from the posterior probability distribution for the attribute value is greater than a prior probability from the prior probability distribution for the attribute value, and if so, determines that the attribute value is a preference for the query term,
wherein the at least one computing device further:
receives a query, wherein the received query comprises a plurality of query terms;
determines a first subset of query terms of the plurality of query terms of the received query that match attribute values of the table of attribute values;
determines a second subset of query terms of the plurality of query terms of the received query that do not match attribute values of the table of attribute values;
for the query terms of the second subset of terms, identifies one or more attribute values that are preferences for the query terms of the second subset of query terms; and
presents a plurality of products or services having at least one attribute value that matches an identified attribute value.

15. The system of claim 14, wherein determining that the attribute value is a preference for the query term comprises determining that the attribute value is a latent preference for the query term.

16. The system of claim 14, wherein the table of attribute values comprises attribute values associated with a plurality of products or services.

17. The system of claim 14, wherein the at least one computing device further ranks the plurality of products or services.

* * * * *